United States Patent [19]

Kromer et al.

[11] 4,176,968
[45] Dec. 4, 1979

[54] THREE SECTIONED MIXER HAVING INDIVIDUAL THERMAL CONTROLS

[75] Inventors: Heiner M. Kromer, New York, N.Y.; John Ossman, Clifton, N.J.

[73] Assignee: Haake, Inc., Saddle Brook, N.J.

[21] Appl. No.: 921,429

[22] Filed: Jul. 3, 1978

Related U.S. Application Data

[63] Continuation-in-part of Ser. No. 713,627, Aug. 11, 1976, abandoned, which is a continuation-in-part of Ser. No. 710,795, Aug. 2, 1976, Pat. No. 4,033,557.

[51] Int. Cl.² ............................................. B29B 1/06
[52] U.S. Cl. ......................................... 366/97; 73/59; 366/100; 366/145; 366/300
[58] Field of Search ..................... 366/69, 96, 97, 100, 366/144, 145, 146, 147, 292, 297, 300; 73/59

[56] References Cited

U.S. PATENT DOCUMENTS

| 3,169,395 | 2/1965 | Enoch et al. | 73/59 X |
| 3,667,733 | 6/1972 | Fritsch | 366/81 |
| 3,749,375 | 7/1973 | Hermann et al. | 366/82 |
| 3,764,114 | 10/1973 | Ocker | 366/301 |
| 3,800,597 | 4/1974 | Paul et al. | 73/59 |
| 3,822,867 | 7/1974 | Evans | 366/79 |

Primary Examiner—George F. Mautz
Attorney, Agent, or Firm—Silverman & Gandhi

[57] ABSTRACT

The present invention provides an apparatus for preparing and testing material samples, comprising a back plate and a center section having two mixing chambers formed by two adjacent circular apertures in the center section, each of the mixing chambers having an interior surface with a first angulation sloping down toward the back plate, the center section also including a port in fluid communication with the mixing chambers and the outside of the center section for disposing a material sample within the mixing chambers, the center section being releasably secured to the back plate. A pair of contrarotating rotors, each rotor having an axial shaft and being axially disposed within one of the mixing chambers, is provided, each rotor exhibiting an exterior surface angulation opposite in slope to the first angulation of the mixing chambers, wherein, by virtue of the opposing angulations, there is imparted to the sample within the chambers, a self-releasing physical characteristic which enables the sample to become readily separated from the walls of the mixer and surfaces of the rotors without damage to either the sample or the mixing apparatus. The present apparatus also includes a front plate adapted to be releasably secured to the center section, wherein the counter-rotation of the rotors within the mixing chambers results in the thorough mixing of a flowable sample material within the mixing chambers. The present apparatus also includes a drive shaft for rotating the rotors, a motor shaft for rotating the drive shaft, and a shear pin coupling for attaching the motor shaft to the drive shaft. The apparatus also includes a heating means and a cooling means which is electrically coupled to a sensing means for insuring a homogeneous thermal pattern within the sample material at each stage of the mixing process, the heating, cooling and sensing means being disposed within the three sections.

11 Claims, 9 Drawing Figures

THREE SECTIONED MIXER HAVING INDIVIDUAL THERMAL CONTROLS

REFERENCE TO RELATED APPLICATIONS

This application is a continuation-in-part of Ser. No. 713,627, filed Aug. 11, 1976, (now abandoned) which application was itself a continuation-in-part of Ser. No. 710,795, filed Aug. 2, 1976, and now issued as U.S. Pat. No. 4,033,557.

BACKGROUND OF THE INVENTION

The instant invention relates to an apparatus for determining processing and mixing characteristics of a variety of materials, for example, thermoplastics, fiberglass, clays, asbestos, quartz-base materials, and wood-related materials. Such materials often exhibit strong abrasive properties and, as such, have presented problems of damage to the test apparatus as well as of removability of such materials from the test chamber after they have been mixed and cured.

Accordingly, a long-standing problem in the area of characteristic testing of materials of the above-mentioned categories has related to the recovery of samples which have been mixed under conditions intended to otherwise stimulate those encountered during actual production.

In any such stimulation, it is of course desirable that the sample not be substantially altered or affected during the process of its removal from the test chamber. Accordingly, a problem which has been associated with test sample apparatus for thermoplastic and other materials has related to the ease of removability of the sample. This problem is closely related to the problem of reproduceability of test results conducted upon such samples. Damage to a particular sample will result in alterations of its characteristic, therefore, creating problems of correlation between various test sample operations. Thus, it may be appreciated that efforts in securing adequate quality control over various extrusion and other plastic-forming processes have been encumbered by the tendency of such plastic (and other) materials to resist removal from the test chamber.

More particularly, a typical prior art mixer would consist of a mixing chamber in which counter-rotating rotors impact against granules of the test material, thus involving pressure against both the walls of the mixing chamber and within the physical structure of the test material. For example, see U.S. Pat. No. 3,800,597 (1974) to Paul entitled "Apparatus for Determining the Processing Characteristics of Plastic Type Materials."

Such mixers are usually thermal-liquid heated and consist of a bowl and backstand. The backstand is generally equipped with a plurality of gears which serve to drive the rotors as well as to regulate their rates of rotation.

After the test material is introduced into the mixer bowl, it is heated and mixed until fluxing occurs. This produces various shear processes which are a result of the physical and chemical effects of the conditions of heat and pressure which occur during the mixing.

The measuring objective of such testing is to monitor the time span during which the material possesses its lowest viscosity, that is, the period prior to cross-linking. The time span is of significance in the optimization of process-conditions during extrusion, injection molding, lamination and other procedures.

The construction of commonly available mixers requires that the rotors rotate sufficiently long until the cross-linking or setting of the thermoplastic material occurs; however, in this approach, the rotating force of the rotors will often mechanically impair or destroy the sample, often reducing it to powder form. Thus, all that is sometimes left to test is a pulverized sample. Further, even where such pulverization does not normally occur, a partial impairment of the thermo-set physical structure of the sample is often unavoidable in effectuating its removal from the mixer bowl and later in the cleansing of the bowl, rotors and backstand so that the apparatus can be reused in future tests.

On occasion, the material may cure or harden within the bowl to such an extent that its removal is impossible without forcibly hammering or chiseling the sample out. Obviously, such an approach not only impairs the physical characteristics of the sample, but also can cause substantial harm to the test apparatus which may be formed of stainless steel and/or other material sensitive to abrasion and injury. Accordingly, it may be appreciated that such a procedure for obtaining thermoplastic samples has become a major drawback in the perfection of various plastic and material-forming processes. Hence, it is to be appreciated that a problem has long existed with respect to test reproducability and correlation of test results. The present apparatus may be viewed as a solution to the above set forth long-standing problems.

SUMMARY OF THE INVENTION

The present invention provides an apparatus for preparing and testing material samples, comprising a back plate and a center section having two mixing chambers formed by two adjacent circular apertures in the center section, each of the mixing chambers having an interior surface with a first angulation sloping down toward the back plate, the center section also including a port in fluid communication with the mixing chambers and the outside of the center section for disposing a material sample within the mixing chambers, the center section being releasably secured to the back section. A pair of contrarotating rotors, each rotor having an axial shaft and being axially disposed within one of the mixing chambers, is provided, each rotor exhibiting an exterior surface angulation opposite in slope to the first angulation of the mixing chambers, wherein, by virtue of the opposing angulations, there is imparted to the sample within the chambers, a self-releasing physical characteristic which enables the sample to become readily separated from the walls of the mixer and surfaces of the rotors without damage to either the sample or the mixing apparatus. The present apparatus also includes a front plate adapted to be releasably secured to the center section, wherein the counter-rotation of the rotors within the mixing chambers results in the thorough mixing of a flowable sample material within the mixing chambers.

The present apparatus also includes a drive shaft for rotating the rotors, a motor shaft for rotating the drive shaft, and a shear pin coupling for attaching the motor shaft to the drive shaft.

The apparatus also includes a heating means and a cooling means which is electrically coupled to a sensing means for insuring a homogeneous thermal pattern within the sample material at each stage of the mixing process, the heating, cooling and sensing means being disposed within the three sections.

Accordingly, it is a principal object of the present invention to provide an apparatus for preparing testing material samples without damage, either physical or chemical, to either the test sample or to the test apparatus.

It is a further object of the present invention to provide an apparatus for preparing and testing material samples in which the material sample can be maintained at a constant pressure and temperature level within the mixing chambers by means of a suitable monitoring system.

It is a still further object of the present invention to provide an apparatus for preparing and testing material samples which is easy and economical to use.

Further objects and advantages of the present invention will become apparent from the ensuing description with reference to the drawings.

DETAILED DESCRIPTION OF THE INVENTION

Figure 1:
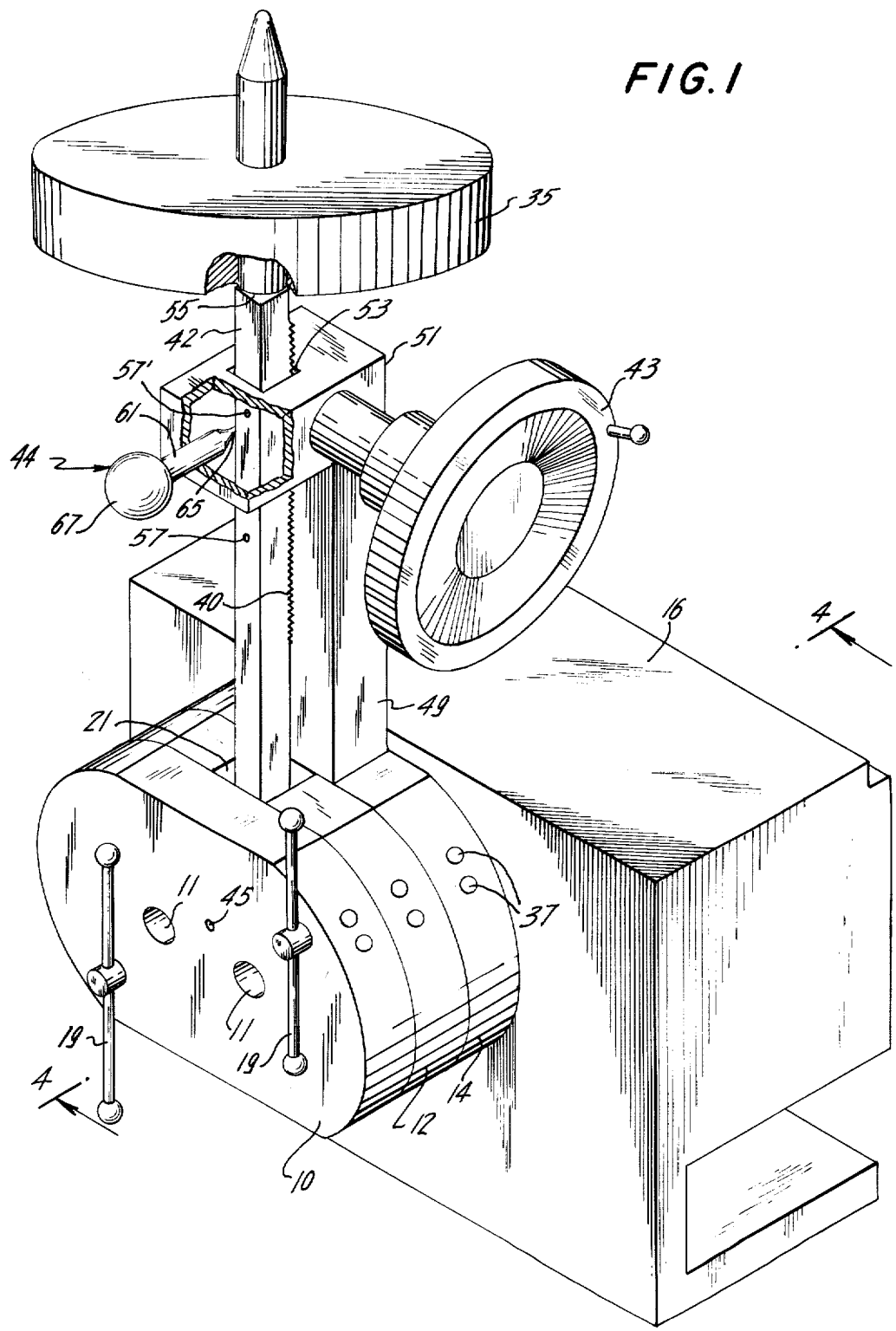
FIG. 1 is a partially broken away, perspective view of the present apparatus shown in operating condition.
Figure 2:
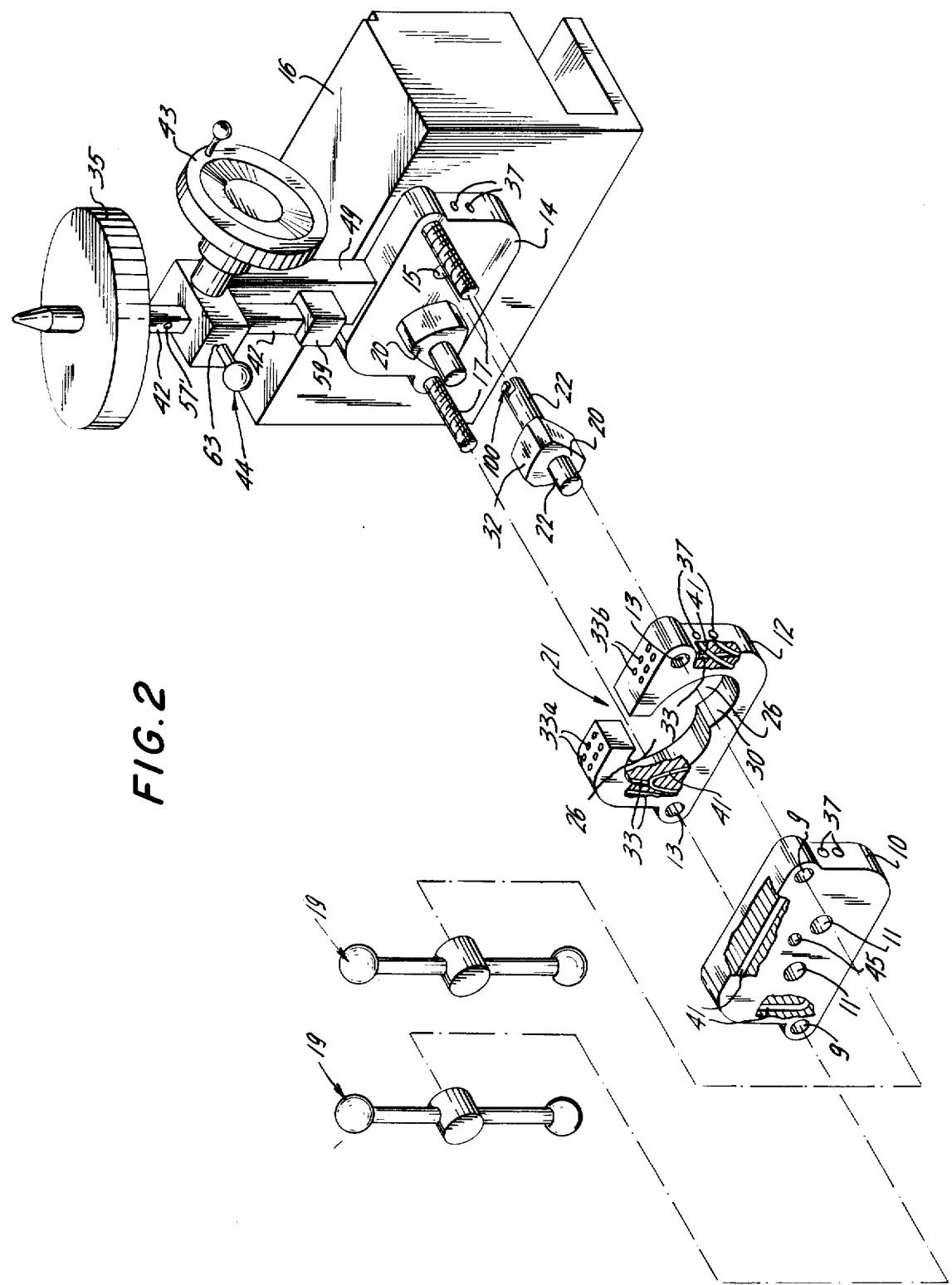
FIG. 2 is an exploded, partially broken away perspective view of the apparatus.
Figure 3:
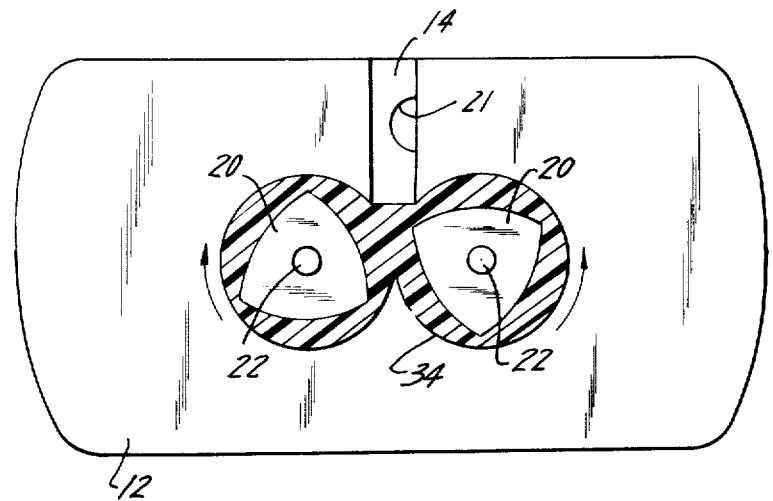
FIG. 3 is a front view of the center section, back plate, and rotors, of the present invention, as it mixes the material.

Referring to FIGS. 1 through 3, wherein like numerals represent like parts, a mixer apparatus in accordance with the present invention is provided comprising a backstand 16 and three sections, a back plate 14 fixedly attached to backstand 16, a center section or bowl 12 removably securable to back plate 14, and a front plate 10 removably securable to back plate 14 and center section 12.

Back plate 14 is of any suitable configuration, but preferably of a generally rectangular shape, as shown in FIG. 2, or a generally oval shape, as shown in FIG. 1. Fixedly attached to back plate 14, at opposite corners thereof, are screwthreaded studs 17. In addition, back plate 14 includes two spaced, circular apertures or bores 15 therein. Back plate 14 may be formed from any suitable material such as stainless steel or the like.

Figure 5:
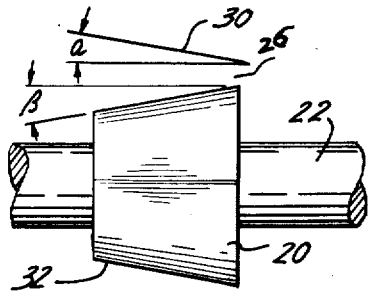
FIG. 5 is a schematic illustration showing the relative angulations of the exterior surface of a rotor and the inner surface of a mixing chamber.

Center section 12 is also preferably of a generally rectangular configuration and is removably securable on screw-threaded studs 17 by means of apertures 13 appropriately placed at opposite corners of center section 12. Center section 12 also includes two mixing chambers 26 formed by two tangential or slightly intersecting circular apertures within center section 12, the circular apertures or mixing chambers 26 having their centers in axial alignment with apertures 15 of back plate 14 when center section 12 is secured on studs 17. The interior surface 30 of each mixing chamber 26 has an angulation $\alpha$ which slopes down from the front of center section 12 adjacent front plate 10, towards the opposite side of center section 12 adjacent back plate 14, as shown in FIGS. 2 and 5. The range of $\alpha$ is preferably between one and four degrees. Further, center section 12 also includes a port 21 centrally located at its top and in communication with the interior chambers 26.

Referring to FIG. 2, front plate 10 is also preferably of a generally rectangular configuration and has two apertures 9 therein at the corners thereof for removably securing front plate 10 on studs 17. Back plate 10 also includes two apertures or bores 11 therein in alignment with apertures 15 of back plate 14 when front plate 10 is disposed on studs 17.

Referring to FIGS. 1 and 2, it can be seen that when center section 12 and front plate 10 are disposed on screwthreaded studs 17, handles 19, having a centrally located internal screw-threaded bore (not shown) can be screw-threadly received on the ends of studs 17 which protrude from apertures 9 of front plate 10 for securing center section 12 and front plate 10 to studs 17. In this manner, it can be seen that the only access to mixing chambers 26, when handles 19 are tightly screwed onto studs 17, is through port 21 at the top of center section 12.

Figure 6:
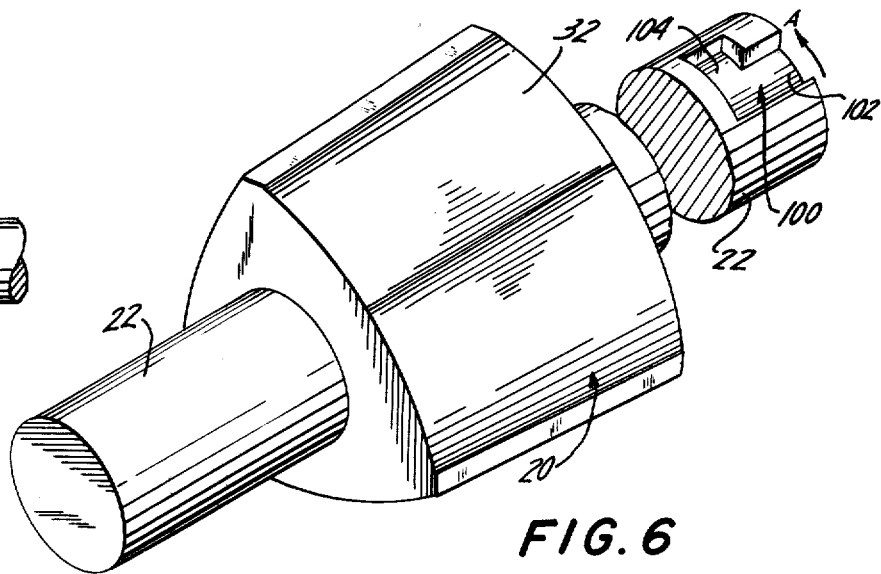
FIG. 6 is a perspective view of one embodiment of a rotor which may be utilized in the present apparatus.

Referring to FIGS. 2, 3 and 6, the present invention also includes a pair of rotors 20, each rotor having an integral shaft 22 extending from both sides thereof. Each rotor 20 may exhibit any one of a number of shapes, including delta, roller, cam, and sigma-type configurations. However, as shown in FIG. 5, each exterior surface 32 of each rotor 20 exhibits a particular angulation $\beta$ which is opposite in slope to the angulation $\alpha$ of the interior surface 30 of the mixing chambers 26 when the rotors 20 are rotatably disposed within mixing chambers 26. The range of $\beta$ is preferably between one and four degrees.

It has been discovered that through the use of such opposing angulations of the surfaces 30 of the mixing chambers 26 and 32 of the rotors 20, there is imparted to the hardened sample 34 (see FIG. 7), a self-releasing physical characteristic which enables a sample to become readily separated from the interior walls 30 of the mixing chambers 26 and the outer surfaces 32 of the rotors 20, without damage to either the sample 34 or to the mixing apparatus.

Figure 4:
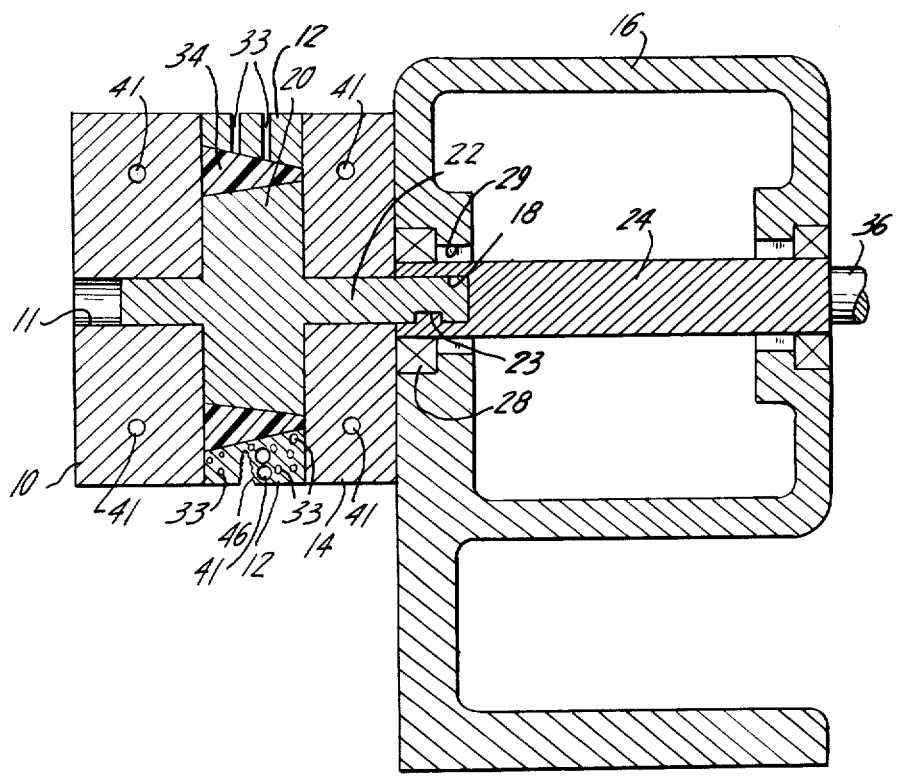
FIG. 4 is a side, cross-sectional view of the present apparatus showing only the three sections and the backstand, taken through line 4—4 of FIG. 1.

Referring to FIGS. 2, 4 and 6, shaft 22 extending from the end of each rotor 20 towards back plate 14 includes a key slot 100 having a first portion 102 axial with shaft 22 and on the surface thereof and a second portion 104 in communication with and at right angles to section 102, this key section 100 being discussed later.

Referring to FIG. 4, backstand 16 includes two drive shafts 24 which are rotatably journaled in bearings 28 within end journals 29 in backstand 16. The front end of each shaft 24, towards front plate 10, has a central aperture 18 therein with a key section 23 providing a raised portion in aperture 18, as shown in FIG. 4. Referring to FIGS. 4 and 6, it can be seen that each rotor 20 is disposed within a chamber 26 such that integral shaft 22 having key opening 100 therein, and more particularly, section 102 thereof, slides over key section 23 and is turned axially thereon such that key section 23 is reciprocably locked within section 104 of key opening 100. In this manner, when shaft 24 is rotated in the direction of arrow A in FIG. 6, rotor 20 of FIG. 6 is forced to rotate at the same speed as its respective shaft 24 and is restrained thereon. In like manner, since rotors 20 are contra-rotating, the sections 104 of each rotor will be disposed 180° from each other, and the other rotor will rotate in a direction opposite to arrow A in FIG. 6. In this manner, each rotor shaft 22 is removably secured within a respective shaft 24 within backstand 16.

Any suitable means can be utilized to rotate the two shafts 24 in opposite directions and at any desired speed. For example, backstand 16 may have disposed therein a gearing system (not shown) for accomplishing this result.

Figure 9:
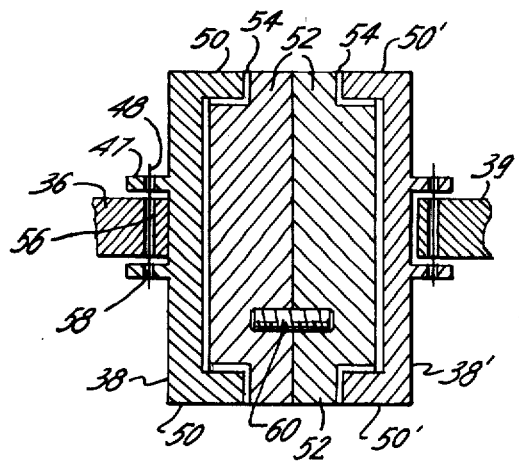
FIG. 9 is a partial schematic, side, cross-sectional view of a drive shaft, and shear pin coupling that can be used with the present invention.

A suitable drive shaft 36 extends from the back of backstand 16 and is rotatably attached by any suitable means to shafts 24 or the gearing system. Drive shaft 36 includes, at its distal end, a circular attaching member 38 centrally attached thereto by any suitable means. For example, as shown in FIG. 9, circular member 38 may include an integral, circular hub section 47, on one side thereof, which slides over drive shaft 36 and is attached thereto by means of a retaining pin 48 which fits through apertures 56 and 58 in drive shaft 36 and hub section 47, respectively. Circular member 38 also includes, on the opposite side thereof, two rectangular or cube-like projections 50, projections 50 being disposed 180° apart near the periphery of circular member 38. In like manner, motor shaft 39 is attached to a corresponding circular member 38 with projections 50'.

Further, a torque rheometer (not shown) is utilized in conjunction with motor shaft 39 for measuring the torque due to the resistance of the material as it hardens. In this manner, when the torque rheometer reaches a certain predetermined value, depending on the material utilized, the motor is turned off and the mixing is completed.

Figure 8:
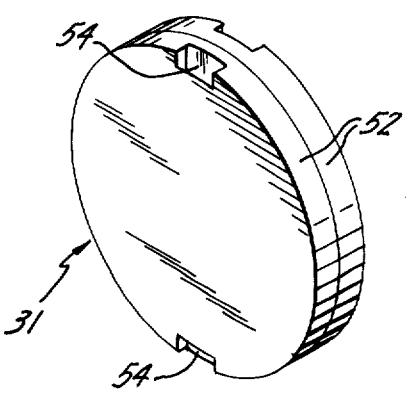
FIG. 8 is a perspective view of a shear pin coupling that can be used with the present invention.

Referring to FIGS. 8 and 9, a shear pin coupling 31 is provided for attaching drive shaft 36 to a motor shaft 39. Shear pin coupling 31 includes two circular sections 52 of equal diameters and centrally aligned in a face-to-face relation. The outer faces of each circular section 52 include rectangular or cube-like grooves 54 180° apart near the periphery of each side, grooves 54 being of similar dimensions to projections 50 and 50' for mating therewith. Sections 52 are retained in the abovedescribed face-to-face relation by any suitable means such as a glue-like adhesive. Frimly embedded within coupling 31 and extending between sections 52 is a shear pin 60 of a known shear strength. Shear pin coupling 61, besides coupling drive shaft 36 to motor shaft 39, serves to protect the apparatus and hardened material 34 from unexpected jerks or jolts which may result from physical irregularities within the mixed material. For example, as discussed later in more detail, the motor is turned off when the material within the chambers 26 reaches a certain hardness, measured by a torque rheometer. Thus, if the motor is turned off when the torque rheometer reads a reverse torque of 10,000 meter grams, shear pin coupling 31 can be chosen such that shear pin 60 will have a shear strength of 12,000 meter grams. In this manner, under normal operation conditions, shear pin 60 will not shear since the motor will be turned off before the reverse torque reaches this value. However, if, for example, a spatula falls into mixing chambers 26 accidentally or someone fails to turn the motor off at 10,000 meter grams of reverse torque, little or no damage will occur to the apparatus since shear pin 60 will shear at 12,000 meter grams, and sections 52 will be free to rotate with respect to each other, thus disengaging motor shaft 39 from drive shaft 36.

In this manner, motor shaft 39, drive shaft 36, journaled shafts 24 and rotor shafts 22 are secured to one another such that the rotation of motor shaft 39 assures the contra-rotation of rotors 20 within mixing chambers 26 to mix the material therein.

Referring to FIGS. 1 and 2, fixedly mounted on top of back plate 14 is a vertical stand 49 which has attached at its upper end a hollow gear box 51. Gear box 51 includes suitable apertures 53 at its top and bottom for reciprocably mounting an elongated gear rack 42 therein. Gear rack 42 is preferably of a square of rectangular cross-sectional configuration and tapers at its upper end into a circular cross-sectional configuration. In this manner, a ledge 55 is formed at the juncture of the rectangular and circular cross-sectional configurations. At the lower end of gear rack 42 is a ram 59 of a rectangular or cube configuration, ram 59 having dimensions substantially equal to port 21 in center section 12 and being aligned therewith, as shown in FIGS. 1 and 2. In this manner, when the present apparatus is locked into a unitary structure by handles 19, and gear rack 42 is reciprocably lowered such that ram 59 is disposed within port 21 of center section 12, there are provided two chambers 26 in center section 12 with no access to the outside. Gear rack 42 also includes two spaced apertures 57 and 57' therein on the side of gear rack 42 facing front plate 10, a lower aperture 57 for retaining gear rack 42 in a raised position and an upper one 57' for retaining gear rack 42 in a lowered position such that ram 59 is retained fixedly within port 21, to be later discussed.

Referring to FIGS. 1 and 2, it is seen that a gear rack wheel 43 is provided in association with gear box 51 for vertically and reciprocably moving gear rack 42 within gear box 51 by a conventional rack and pinion gear system (not shown) within gear box 51, such as commonly found on microscopes. In this manner, wheel 43 is attached to a worm gear (not shown) which interacts with gear teeth 40 on gear rack 42.

Referring to FIGS. 1 and 2, the present invention also includes a lock 44 having a shaft 61 reciprocable within an aperture 63 in the side of gear box 51 facing front plate 10, the end of shaft 61 having a retaining pin section 65 thereon which fits within apertures 57 and 57' of gear rack 42. A handle 67 is also provided at the opposite end of shaft 61 to allow a person to reciprocably move lock 44 within aperture 57 or 57' to lock gear rack 42 in a desired position by means of retaining pin section 65 being disposed within aperture 57 or 57' or gear rack 42.

Referring to FIGS. 1 and 2, the present invention also includes a means 35 for maintaining a uniform pressure level within chambers 26 for loading the material therein within a specific time period. This means preferably comprises a weight disposed on gear rack 42 at its upper end and resting upon ledge 55 thereof for exerting a constant pressure on ram 59 when ram 59 is disposed within port 21 of center section 12. In practice, it has been found that a 5 kilogram weight will provide this uniform pressure.

Figure 7:
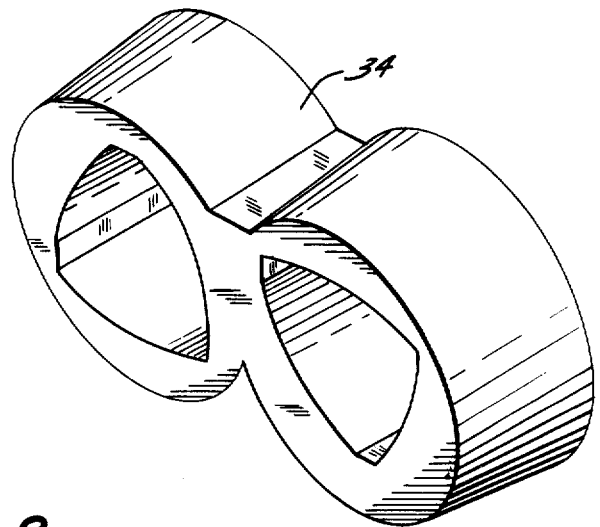
FIG. 7 is a perspective view of a sample obtained through the use of the present apparatus.

In operation, all three sections 10, 12 and 14 are assembled in a unitary structure on studs 17 and tightened together by means of handles 19, thus providing that the only access to chambers 26 and center section 12 is through port 21. The sample material, in pellet form, is then placed within chambers 26 through port 21. Thereafter, lock 44 is pulled out of aperture 57 in gear rack 42, such that the 5 kilogram weight 35 slowly forces ram 59 through port 21 to entirely close off chambers 26 until aperture 57' is aligned with pin section 65 of lock 44. Thereafter, pin section 65 is pushed into aperture 57' to lock ram 59 within port 21. Through motor shaft 39, rotors 20 are caused to rotate in opposite directions to mix the sample material, in pellet form, in mixing chambers 26. As rotors 20 mix this sample material, the pellet material heats up and turns into a liquid material which then begins to harden into a hardened sample 34, as shown in FIG. 7. When the torque rheometer reaches a certain level, indicating that sample 34 has reached a certain viscosity or hardness, the motor is turned off and hardened material sample 34 is allowed a certain amount of time to cool. Thereafter, retaining pin 65 is pulled out of aperture 57', gear rack 42 is elevated by means of gear rack wheel 43, and retaining pin 65 is pushed into aperture 57 to retain gear rack 42 and ram 59 in a raised position. Handles 19 are then removed and front section 10 is removed from studs 17. Because of the inclination of exterior surfaces 32 of rotors 20 and interior surfaces 30 of chambers 26, a self-releasing physical characteristic is imparted to hardened sample 34 which enables the sample to become readily separated from the inner surfaces 30 of chambers 26 and the surfaces 32 of the rotors without damage to either sample 34 or to the mixing apparatus. Further, no deformation of the sample will occur. For further details with respect to the loading and unloading procedure, reference is made to the copending application, now issued as U.S. Pat No. 4,033,557.

The thermal characteristics of each of the three sections 10, 12 and 14 of the apparatus are individually controlled through the use of electrical heating elements and circumferential fluid channels adapted for the passage therethrough of compressed air. The objective of such separate thermal characteristic control means is to insure a homogeneous thermal pattern within the sample at each stage of the mixing process. It has been found that, in the absence of the provision of separate thermal control means for the front plate, center section and back plate respectively, a non-homogeneous or non-uniform thermal pattern will occur within the mixing chamber 26. Accordingly, the electrical and compressed air thermal control means are individually programmed by conventional means and, further, are each provided with their own thermal sensors.

Referring to FIGS. 2 and 4, there are provided electrical heating elements 41 in each of the three sections 10, 12 and 14, these heating elements being shown in a schematic, partially broken away view in front section 10 in FIG. 2 and in crosssection in FIG. 4. It should be noted that although the elements 41 are only shown in front plate 10 and center section 12 in FIG. 2, in a broken away view, the remaining section 14 also contains these elements. In practice, it has been found that the use of tubular heaters, like those found on electric stoves, provide adequate heating means for each tubular heating element. Two sockets 37 may be utilized (in each of the sections) for electrically coupling a power source (not shown) to heating elements 41.

Referring to FIGS. 2 and 4, circumferential fluid channels 33 are provided in center section 12 such that compressed air may be passed therethrough for cooling the material within chambers 26. Referring to FIG. 2, each fluid channel 33 ends at the top of center section 12 and on either side of port 21. In this manner, an air manifold can be attached to the channel ends 33a on one side of port 21 for forcing compressed air through channels 33 in order to reduce the temperature within chambers 26, and an exhaust manifold can be attached to the opposite ends 33b of channels 33 to provide an exit for the air forced through channels 33.

The power supply for heating elements 41 and the air manifold for circumferential fluid channels 33 for the three sections 10, 12 and 14, are individually programmed and, further, are each provided with their own thermal sensors. In the event that a sensor of any of the sections 10, 12 or 14 monitors a temperature below that which is required by its program, the heating elements will be activated in order to increase the temperature within the particular section. In the event that the temperature of the material or center section 12 monitored by a sensor is higher than that required by its program, compressed air is forced through the channels 33 in order to thereby reduce the temperature of the material.

Referring to FIGS. 1, 2 and 4, front plate 10 and back plate 14 preferably include a type 640 thermocouple disposed axially therein in suitable thermocouple apertures 45, only aperture 45 of front plate 10 being shown in FIG. 2. The thermocouple disposed within aperture 45 of front section 10 is the only thermocouple in contact with the sample material and is disposed within aperture 45 of front section 10 such that the measuring tip of the thermocouple is flush with the inner wall of front plate 10. The thermocouple of back plate 14 does not extend through an inner wall of back plate 14 but only measures the temperature of back plate 14 due to the material within chambers 26. In this manner, disposing the thermocouples, as described, within front plate 10 and back plate 14, eliminates the problem of possible thermocouple breakage during removal of the sample, and provided an adequate measuring device. The thermocouples may be releasably secured within apertures 45 by any suitable means such as being screw-threadedly received therein, as shown in apertures 46 in center section 12 in FIG. 2, to be later discussed. Any suitable monitor may be plugged into the thermocouples within apertures 45 for monitoring and controlling the temperature of the material within chambers 26.

The preferred thermal sensors utilized in center section 12 are known as type G thermocouples. These theremocouples are disposed at the bottom of center section 12, through screw-threaded, thermocouple apertures 46. As with the thermocouple in back plate 14, and as shown in FIG. 2, these thermocouples do not contact the sample material, but rather, only measure the temperature of center section 12 due to the temperature of the sample material therein. These thermocouples are also attached to a suitable monitor.

In this manner, the thermocouple sensors can be electrically connected to a suitable monitor which also controls the cooling and heating elements 33 and 41, respectively, in accordance with measurements made by the thermocouples. In addition, the sensors within the mixing chamber can serve, through the use of an appropriate conversion program, as a means for monitoring the viscosity of a sample in order to ascertain the point at which cross-linking of interest of the material is attained, this latter aspect being discussed more fully in our co-pending application, now issued as U.S. Pat. No. 4,033,557.

It is to be understood that the invention is not limited to the illustrations described and shown herein, which are deemed to be merely illustrative of the best mode of carrying out the invention, and which are suitable of modification of form, size, arrangement of parts and details of operation. The invention rather is intended to encompass all such modifications which are within the spirit and scope as defined by the claims.

What is claimed is:

1. An apparatus for preparing and testing material samples, comprising:
   a back plate;
   a center section having two mixing chambers, each of said mixing chambers having an interior surface with a first angulation sloping down toward said back plate, said center section being releasably secured to said back plate;
   a pair of contra-rotating rotors, each rotor having an axial shaft and being axially disposed within one of said mixing chambers, each rotor exhibiting an exterior surface angulation opposite in slope to said first angulation of said mixing chambers; and
   a front plate adapted to be releasably secured to said center section,
   wherein the counter-rotation of said rotors within said mixing chambers results in the thorough mixing of a flowable sample material within said mixing chambers.

2. The apparatus of claim 1 wherein said mixing chambers are formed in said center section by two adjacent circular apertures in said center section.

3. The apparatus of claim 1 wherein said center section includes a port in fluid communication with said mixing chambers and the outside of said center section for disposing a flowable material sample within said mixing chambers.

4. The apparatus of claim 3 wherein said apparatus includes a vertically reciprocable gear rack having a ram at its lower end, said ram being of substantially the same dimensions as said port in said center section, wherein said mixing chambers are entirely enclosed when said center section is releasably secured to said back plate and said front plate and said ram is disposed within said port.

5. The apparatus of claim 6 wherein said apparatus includes a means for maintaining a constant pressure level within said chambers when said flowable material is being mixed therein, said means including a weight disposed on said gear rack at its upper end for exerting a constant pressure on said ram when said ram is disposed within said port of said center section.

6. The apparatus of claim 1 wherein the angulation of the exterior surface of said rotors is between one and four degrees and the angulation of the inner surface of said mixing chambers is between one and four degrees.

7. The apparatus of claim 1 wherein said apparatus includes a drive shaft for rotating said rotors, a motor shaft for rotating said drive shaft, and a shear pin coupling for attaching said motor shaft to said drive shaft, wherein said shear pin coupling is sheared when said flowable sample material attains a predetermined hardness, to prevent any damage to said hardened material and said apparatus.

8. The apparatus of claim 1 wherein said apparatus includes heating means disposed within said front plate, said center section and said back plate for insuring a homogeneous thermal pattern within said sample material at each stage of the mixing process, said heating means including electrical wiring circumferentially disposed within said back plate, said center section and said front plate.

9. The apparatus of claim 8 wherein said apparatus includes a cooling means within said center section for insuring a homogeneous thermal pattern within said sample material at each stage of the mixing process, said cooling means including fluid channels within said back plate, said center section and said front plate for the transmission therethrough of compressed air.

10. The apparatus of claim 9 wherein said apparatus includes a sensing means disposed within said front plate, said center section and said back plate for monitoring various cross-sectional temperatures of said sample material, wherein said sensing means includes a thermocouple disposed within said front plate, said center section and said back plate.

11. The apparatus of claim 10 wherein said sensing means operates to control said heating means and said cooling means in accordance with a predetermined program.

* * * * *